United States Patent [19]

Liu

[11] Patent Number: 4,758,042
[45] Date of Patent: Jul. 19, 1988

[54] COLLAPSIBLE SUN SHADE

[76] Inventor: Chi-Nan Liu, P.O. Box 10160, Taipei, Taiwan

[21] Appl. No.: 92,629

[22] Filed: Sep. 2, 1987

[51] Int. Cl.$^4$ ............................................... B60J 3/00
[52] U.S. Cl. ............................. 296/97 G; 296/97 D; 296/97 R; 160/84.1
[58] Field of Search ................. 296/97 R, 97 B, 97 C, 296/97 D, 97 G, 141, 143; 160/84 R, 168 R, 170, 173, 313, 314; 267/158

[56] References Cited

U.S. PATENT DOCUMENTS

| | | | |
|---|---|---|---|
| 1,568,379 | 1/1926 | Hartley | 160/134 X |
| 1,951,659 | 3/1934 | Kesner | 160/170 |
| 3,410,601 | 11/1968 | Thompson | 296/95 C |
| 3,584,910 | 6/1971 | Lupul | 296/97 D |
| 4,442,881 | 4/1984 | Monteath et al. | 160/DIG. 3 |
| 4,647,102 | 3/1987 | Ebrahimzadeh | 296/97 D |
| 4,651,795 | 3/1987 | Valle et al. | 160/168 R X |
| 4,660,612 | 4/1987 | Anderson | 160/178 C X |

Primary Examiner—Robert B. Reeves
Assistant Examiner—Russell D. Stormer

[57] ABSTRACT

A collapsible sun shade includes an upper plate, a lower plate gripping on a lower portion of a window, a serrated shielding element having plural pleated blades consecutively adjoined together and secured between the upper and lower plates, and a coiled spring plate normally resiliently wound on a spindle rotatably mounted in a handle mounted on the upper plate and having its lower end secured with the lower plate so that the upper plate may be lifted to hang on a cupule gripping on an upper portion of a window by extending the spring plate and the shielding element for shielding a sun light.

4 Claims, 4 Drawing Sheets

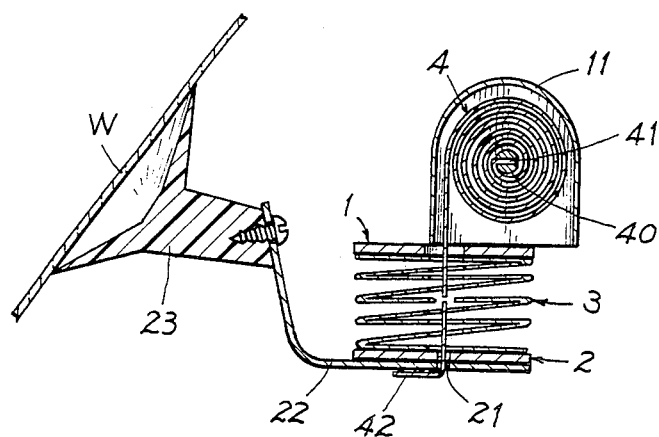
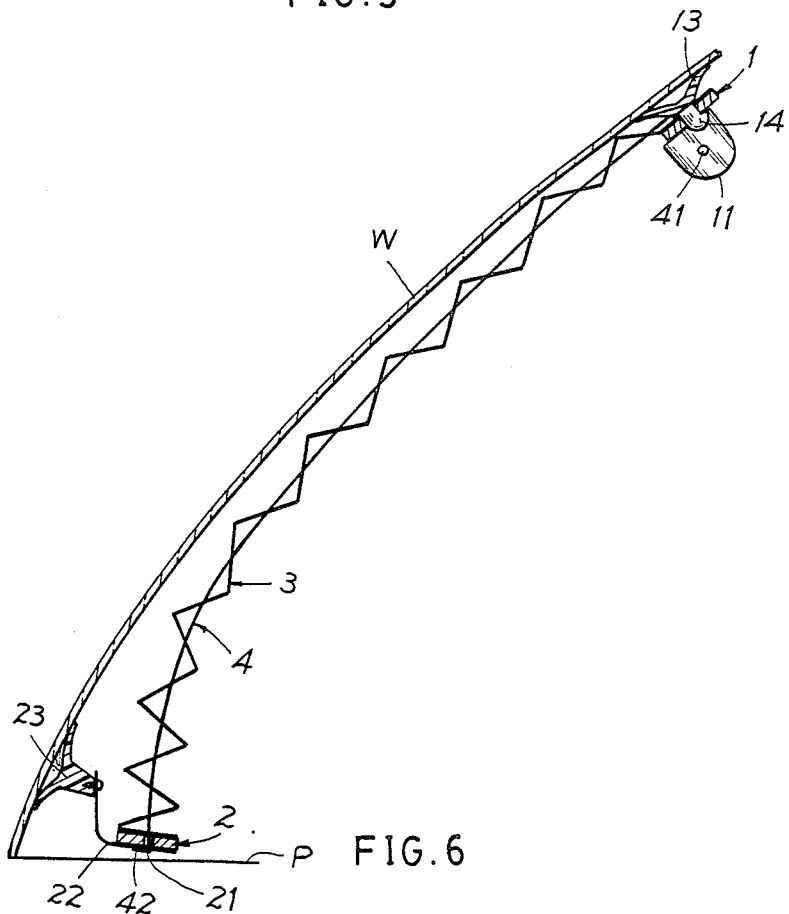

COLLAPSIBLE SUN SHADE

BACKGROUND OF THE INVENTION

Paul R. Maguire disclosed an Automobile Sun Shade in his U.S. Pat. No. 4,606,572 comprising a plurality of substantially flat elongated blades pinned toghther at one end and being arranged to be opened in a fan-like manner or folded to occupy substantially the space of a single blade and secured by a joinder ribbon passing through the central slot of each blade to serve a shade for automobile window and the like. However, such a conventional fan-like sun shade has the following defects:

1. The blades are pinned together at their lower ends which are mounted on a cupule gripping on a flat panel. Once extending the blades, the pulling force acting on the blades may possibly bias the cupule to release its vacuum suction, thereby making the standing of the sun shade unstable.

2. The flat portion as proximate to an instrument panel of a car windshield is generally made of plastic material not so smooth that the cupule may be collapsed as unstable gripping on such a plastic surface to lose the effect of a sun shade.

3. In order to stably open the fan-like blades without biasing and falling down the cupule, two hands must be used to operate the blades, for instance, one hand holding one side of the blades and the other hand pulling the other side of the blades for opening the same, to cause inconvenience for a user.

The present inventor has found the defects of such a conventional sun shade and invented the present collapsible sun shade.

SUMMARY OF THE INVENTION

The object of the present invention is to provide a collapsible sun shade including an upper plate, a lower plate gripping on a lower portion of a window, a serrated shielding means having plural pleated blades consecutively adjoined together to form a serrated shape as viewed from its longitudinal section and secured between the upper and lower plates, and a coiled spring plate having its upper end normally wound on a spindle rotatably mounted in a handle fixed on the upper plate and having its lower end fixed under the lower plate wherein the upper plate may be lifted to hang on an upper cupule gripping on an upper portion of a window by extending the coiled spring plate and the shielding means for sun-shielding purpose.

BRIEF DESCRIPTION OF THE DRAWINGS

FIG. 5 shows a folded sun shade of the present invention.

FIG. 6 shows an extended sun shade of the present invention.

DETAILED DESCRIPTION

Figure 1:
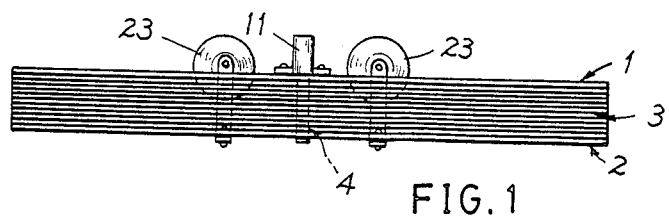
FIG. 1 is a rear view of the present invention.
Figure 2:
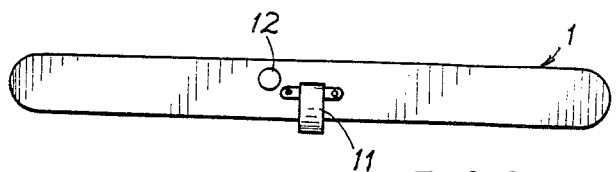
FIG. 2 is a top view of the upper plate of the present invention.
Figure 3:
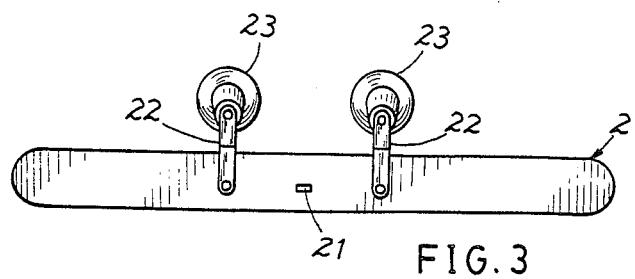
FIG. 3 is a top view of the lower plate of the present invention.
Figure 4:
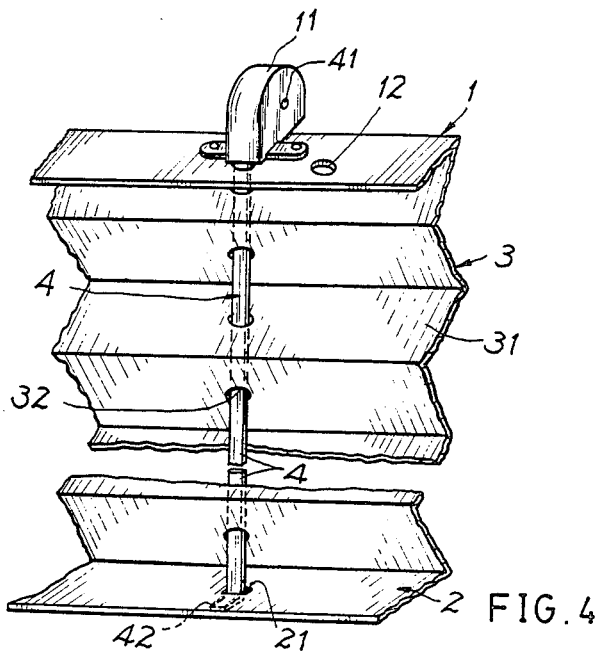
FIG. 4 is a partial persevtive view of the present invention.

As shown in FIGS. 1-9, the present invention comprises: an upper plate 1, a lower plate 2, a serrated shielding means 3, and a coiled spring plate 4.

The upper plate 1 includes a handle 11 mounted on a central portion of the plate 1 having a hollow casing for spirally winding the coiled spring plate 4 therein, a hanging hole 12 formed on the central portion of the plate 1 and an upper cupule 13 having a hook portion 14 formed on the cupule 13 engageable with the hanging hole 12 of the plate 1, adapted for gripping the upper plate 1 on an upper portion of a window W.

The lower plate 2 includes a retaining slot 21 formed on its central portion for passing and retaining a lower end portion 42 of the coiled spring plate 4, and plural brackets 22 respectively securing the lower plate 2 to plural corresponding lower cupules 23 adapted for gripping the plate 2 on a lower portion of a window W.

The serrated shielding means 3 includes plural pleated blades 31 consecutively adjoined together to form a serrated shape as viewed from its longitudinal section and having its upper blade secured to the upper plate 1 and having its lower blade secured to the lower plate 2. Each blade 31 is formed with a central slot 32 thereon for passing the spring plate 4 through the slot 32.

The coiled spring plate 4 is normally resiliently wound on a spindle 40 rotatably mounted in the handle 11 from the upper end portion 41 of the spring plate 4 and has its lower end portion 42 fixed under the lower plate 2 through the retaining slot 21 on the plate 2. The spring plate 4 passes through all central slots 32 of the blades 31 of shielding means 3 as limited between the upper end portion 41 in the handle 11 and the lower end portion 42 on the lower plate 2. The lower end portion 42 may be formed as a bending portion fixed under thd lower plate 2.

Figure 7:
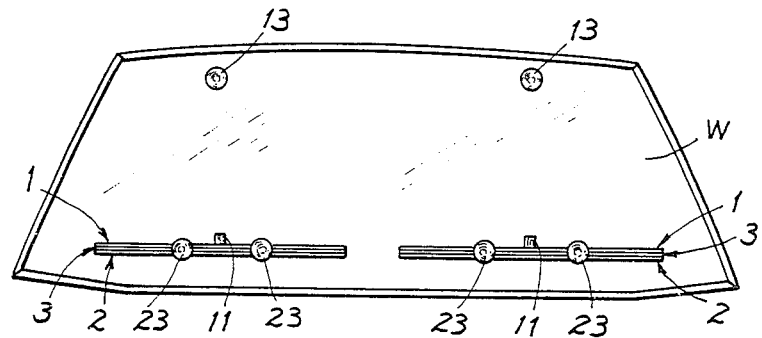
FIG. 7 shows a folded sun shade of the present invention when applied on a car window.
Figure 8:
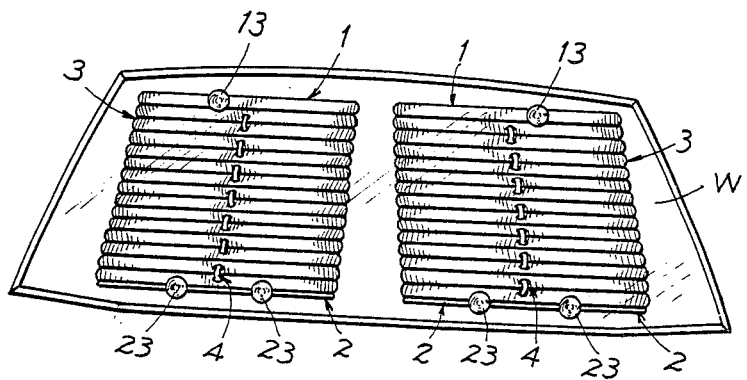
FIG. 8 shows an extended sun shade when applied in a car.
Figure 9:
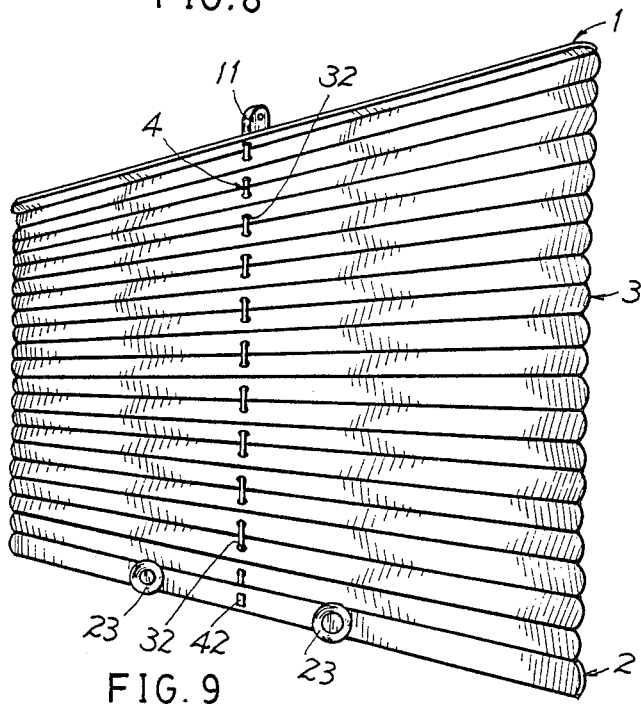
FIG. 9 is a perspective view of the present invention when extended.
Figure 10:
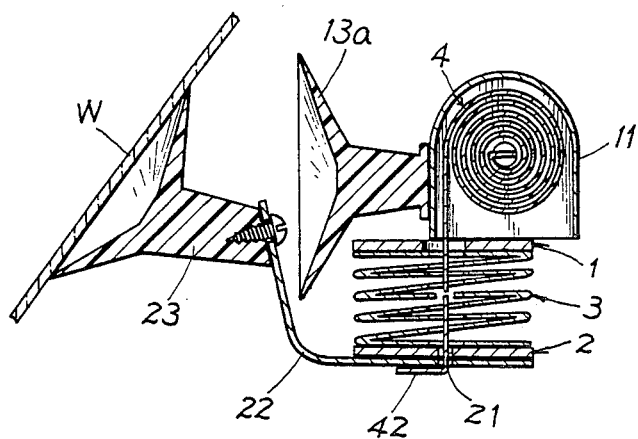
FIG. 10 shows a folded sun shade of another preferred embodiment of the present invention.
Figure 11:
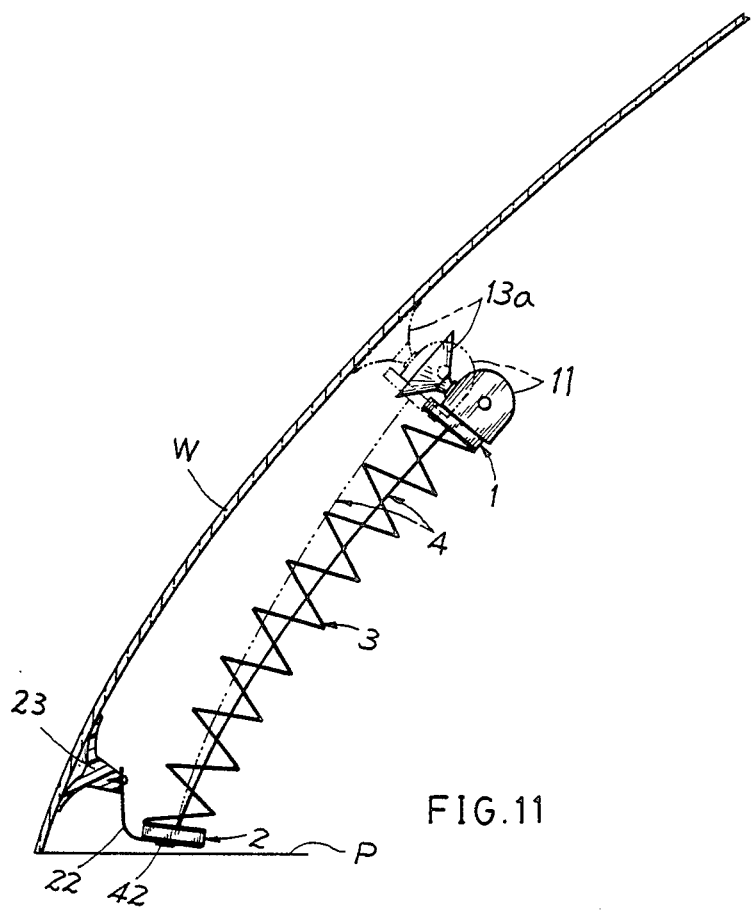
FIG. 11 shows an extended sun shade as developed from FIG. 10.

When using the present invention, the lower cupules 23 are gripped by vacuum suction on a lower portion of a window such as a windshield or a rear window of a car and the upper cupule 13 is gripped on an upper portion of the window, and the handle 11 is lifted by a user to allow th hanging hole 12 engaged with the hook portion 14 of the upper cupule 13 to thereby extend the shielding means 3 from its folded position as shown in FIGS. 5 and 7 toward the extended position as shown in FIGS. 6 and 8 for sun-shielding purpose.

Since the coiled spring plate 4 is normally resiliently wound on the spindle 40 in the handle 11, once removing the handle 11 from the upper cupule 13 the resilience force of the spring plate 4 will restore the plate 4 to be wound into the handle casing so as to retract the upper plate 1 toward the lower plate 2 to fold the shielding means 3 as secured between the two plates 1, 2 as shown in FIG. 5. The shielding means 3 may be made of heat and light insulating materials.

Another preferred embodiment of the present invention is shown in FIGS., 10, 11 which comprises an upper cupule 13a directly secured on a front portion of the handle 11 so that the handle 11 can be lifted upwardly to any position and then be depressed toward the window surface to allow the cupule 13a gripping on the window optionally.

The present invention has therefore the following advantages superior to a conventional sun shade:

1. The lower cupules 23 are normally gripped on the lower portion of a window so that only a single hand of a user can easily operate the handle 11 to extend the shielding means 3 quickly and conveniently.

2. Upper and lower cupules are provided to stably grip the sun shade on a smooth window surface without worrying the falling down of the sun shade.

3. The shielding area can be optionally adjusted by suitably gripping the relevant cupules 13 or 23 on the window for better choices of shielding purpose.

4. The shielding means 3 is serratedly folded into multiple folds, not pinned together at one end or reeled into a sleeve, so that even if the blades 31 are slightly deformed under serious sunlight exposure, they can still be folded together to form a folded compact unit, or fully extended for sun-shielding purpose. (But this application is not deformed by good quality of blades.)

The spindle 40, if necessary, may be further provided with a restoring spring (not shown) to help restore the spring plate 4 into the handle casing 11.

Naturally, the present invention can also be applied horizontally so that the shielding means 3 can be transversely extended across a car window or the like.

I claim:

1. A collapsible sun shade comprising:

an upper plate having a handle formed with a hollow casing therein and mounted on said upper plate, a hanging hole formed on a central portion of said upper plate, and an upper cupule having a hook portion formed thereon engageable with the hanging hole for gripping said upper cupule and said upper handle on an upper portion of a window;

a lower plate having a retaining slot formed thereon, plural brackets securing said lower plate to plural corresponding lower cupules adapted for gripping said lower plate on a lower portion of a window;

a serrated shielding means including plural pleated blades consecutively adjoined together to form a serrated shape as viewed from its longitudinal section, having its upper blade secured to said upper plate and having its lower blade secured to said lower plate, each blade formed with a central slot thereon; and a coiled spring plate normally resiliently wound on a spindle rotatably mounted in said hollow casing of said handle from an upper end portion of said spring plate, said spring plate passing through all said central slots on said blades and having a lower end portion of said spring plate passing through said retaining slot of said lower plate to be retained under said lower plate, whereby upon the lifting of said handle, said shielding means is extended for sun shielding purpose as retained between said upper and lower cupules gripping on the window.

2. A sun shade according to claim 1, wherein an upper cupule is directly secured on a front portion of said handle so that said handle can be optionally lifted to any position of a window for gripping said upper cupule and said handle on the window.

3. A sun shade according to claim 1, wherein the lower end portion of said spring plate is formed as a bending portion fixed under said lower plate.

4. A sun shade according to claim 1, wherein said spindle of said coiled spring plate is restored in said handle by a restoring spring.

* * * * *